United States Patent [19]

Lehmann et al.

[11] Patent Number: 5,704,386

[45] Date of Patent: Jan. 6, 1998

[54] MULTISTAGE REGULATING VALVE

[75] Inventors: Uwe Lehmann, Woerrstadt; Bodo Stich, Wiesbaden; Maik Wilhelm, Trebur, all of Germany

[73] Assignee: Mercedes-Benz AG, Stuttgart, Germany

[21] Appl. No.: 693,106

[22] PCT Filed: Feb. 9, 1995

[86] PCT No.: PCT/DE95/00170

§ 371 Date: Aug. 12, 1996

§ 102(e) Date: Aug. 12, 1996

[87] PCT Pub. No.: WO95/22025

PCT Pub. Date: Aug. 17, 1995

[30] Foreign Application Priority Data

Feb. 11, 1994 [DE] Germany .................. 44 04 358.9

[51] Int. Cl.⁶ .................. G05D 11/00; F16K 31/12; F16K 31/36

[52] U.S. Cl. .................. 137/115.13; 137/508; 137/628

[58] Field of Search .................. 137/512.1, 508, 137/538, 628, 512.2, 512.3, 599.2, 115.13, 115.14

[56] References Cited

U.S. PATENT DOCUMENTS

| 423,003 | 3/1890 | Vielhaber | 137/512.2 |
|---|---|---|---|
| 2,173,819 | 9/1939 | Boldt | 137/115.13 |
| 2,507,384 | 5/1950 | Schneck | 137/508 |
| 2,510,052 | 6/1950 | Navarro et al. | 137/508 |
| 2,724,239 | 11/1955 | Fox | 137/538 |
| 2,890,715 | 6/1959 | Ebersold | 137/494 |
| 3,007,481 | 11/1961 | Frost | 137/115.14 |
| 3,450,155 | 6/1969 | Froehner et al. | 137/508 |
| 3,898,999 | 8/1975 | Haller | 137/512.1 |
| 4,478,558 | 10/1984 | Owen | 137/508 |
| 4,699,171 | 10/1987 | Sugden | 137/468 |

FOREIGN PATENT DOCUMENTS 19 41 055   2/1971   Germany .

*Primary Examiner*—Denise L. Ferensic
*Assistant Examiner*—Joanne Kim
*Attorney, Agent, or Firm*—Evenson, McKeown, Edwards & Lenahan, P.L.L.C.

[57] ABSTRACT

A multi-stage regulating valve is provided with a cylinder and an adjusting piston guided inside it to which a regulating pressure can be applied from one side and a return force from the other. Depending on the regulating pressure, the piston keeps at least one outlet aperture in the cylinder wall closed or partly or fully opens it and thus closes off a connection to the side of the piston to which the regulating pressure is applied or partly or fully opens it via the outlet aperture. To provide a multistage regulating valve which can alter the regulating characteristics over a wide range depending on the position of the piston even without the use of several return components, the piston consists of at least two partial pistons to which the regulating pressure can be applied, where the force of the return component can be applied to a first partial piston, whereby a follower interconnects the partial pistons in such a way that a return force is exerted on the second partial piston or other partial pistons via the first partial piston and the follower. The cylinder has at least one stop for the second or other partial pistons limiting the movement of the second or other partial pistons under the effect of the regulating pressure and against the action of the return component. The first partial piston is unaffected by the stop and remains movable against the return component if the regulating pressure increases further.

10 Claims, 5 Drawing Sheets

MULTISTAGE REGULATING VALVE

BACKGROUND AND SUMMARY OF THE INVENTION

The present invention relates to a multistage regulating valve with a cylinder and a regulating piston guided therein. The piston can be impacted on one side by a regulating pressure and on the other side by the force of a restoring element, for example a compression spring. Depending on the regulating pressure, the piston exposes at least one opening in the wall of the cylinder not at all, partially, or completely, and thus either interrupts a flow or pressure connection or creates one partially or completely.

Such valves are known from hydraulic control technology. For example, there are valves that have one input and two outputs (or vice versa) whereby the input can be optionally connected with one of the outputs and this connection is produced by holes or the like in the regulating piston. This is done so that optionally, depending on the displacement of the regulating piston, one or the other of the outputs is connected with the input, whereby possibly additional displacement positions of the regulating piston can be provided in which for example none of the outputs or both are connected with the input.

The piston is moved via the action of a regulating pressure acting against one end of the piston, while the other end is impacted by a restoring element, generally a compression spring. The effective piston cross section impacted by the regulating pressure, the spring constant of the compression spring, and the arrangement of the openings and connecting channels is selected so that at very specific ranges of the regulating pressure, very specific desired connections are produced between the inputs and outputs. It is understood that such valves can theoretically have a large number of different inputs and outputs, with the connections being made in the desired pressure range. In addition, the connection for the regulating pressure can be used as the input or one of the inputs of the valve.

In addition to switching and interrupting certain connections in hydraulic or pneumatic systems, always as a function of the value of a regulating pressure, often a certain characteristic of the regulating behavior or the response of the regulating piston is desired. An example of this would be a sudden change in the value of the spring constant of the restoring element, when for example the regulating piston has reached a specific predetermined position. Such a change in the spring constant can be achieved by at least two different compression springs serving as restoring elements, one of which is held back by a stop and only comes into engagement with the piston when the latter has reached the predetermined position. However, the assembly of such multistage restoring elements is sometimes space-consuming and complex and permits only a relatively limited variation in the regulating characteristics.

In contrast to this prior art, the present invention is based on the goal of providing a multistage regulating valve which permits, over a wide range, a change in the regulating characteristic as a function of the position of the regulating piston even without using a plurality of restoring elements.

This goal is achieved by virtue of the fact that the piston consists of at least two partial pistons each impacted by the regulating pressure. A first partial piston is impacted by the force of the restoring element with a dog which connects the partial pistons with one another in such fashion that, at least in a certain position range of the partial pistons, the second partial piston also experiences a restoring force from the restoring element through the first partial piston and the dog. The cylinder has at least one stop for the second partial piston. The stop limits the movement of the second partial piston under the influence of the regulating pressure and against the action of the restoring element, while the first partial piston, unaffected by this stop, remains movable against the restoring element during a further pressure increase.

The dog therefore always operates in only one direction, i.e. the second piston abuts the first partial piston only through the dog and is thus exposed to the force of the restoring element, while the first piston remains movable against the force of the restoring element and also against the second partial piston. This occurs when the second piston comes to rest against a stop that acts in this direction and the pressure on the first partial piston is sufficient to overcome the restoring force acting in this position.

This automatically results in a change in the regulating characteristic, for it is in a first movement range of the piston, namely at the point where both pistons are movable under the influence of the regulating pressure against the force of the restoring element, that the sum of the ends of the two partial pistons is exposed to the regulating pressure and the force determined from the product of these areas and the regulating pressure acts on the restoring element. As the pressure increases, the two partial pistons are displaced against the restoring element, whereby its restoring force generally increases linearly with the displacement travel. However, as soon as the second partial piston has reached the above-mentioned stop, it can no longer contribute to a further transmission of force to the restoring element and, hence, to further movement of the first partial piston. In order for the first partial piston to be displaced further against the force of the restoring element, the regulating pressure that is applied solely to the end of this first partial piston must be so great that the resultant force is at least equal to the force of the restoring element in this position, whereby this force up to this time was applied through the regulating pressure acting on the total surface of both partial pistons. This means that before the first partial piston again begins to move against the restoring element, the pressure must initially rise to a higher value until the loss of effective piston area is compensated by the stop of the second partial piston. Therefore, when the stop is reached by the second partial piston at a pressure P1 up to a higher pressure P2, no further piston movement takes place, whereby these two pressure values are linked with the effective piston areas by the relationship:

$$\frac{P2}{P1} = \frac{F1 + F2}{F1}$$

where F1 is the effective area of the first partial piston impacted by the pressure and F2 is the corresponding area of the second partial piston.

It is understood that the principles explained above can also be extended basically to a larger number, theoretically any number, of partial pistons that are connected step-wise by dogs that are connected in only one direction and have staggered stops. This can be done so that the individual partial pistons reach the stop in succession, whereby after a stop of a partial piston, initially a further piston motion is suppressed until a higher pressure stage has been reached. In a graph which plots on the vertical axis the movement of the first partial piston which is directly connected with the restoring element against the increase in regulating pressure, one would have a sort of step function. The height of the steps and their width can be varied within wide limits by the choice of the position of the stops and the choice of certain cross-sectional areas for the individual partial pistons. In this manner, it is possible to adjust the regulating characteristic of such a regulating valve relatively well to the desired optimum pattern, without expensive and sensitive measuring and regulating systems being required. Although the use of several separate restoring elements with adjusted restoring force is possible for each individual partial piston, such a measure in most cases could be rendered unnecessary merely by a suitable choice of the cross-sectional areas of the partial pistons.

While it is possible to arrange the various partial pistons side by side, if necessary also in separate cylinders, and to connect them together by the above-mentioned dogs, nevertheless an embodiment of the invention is preferred in which the partial pistons are provided concentrically with respect to one another in the form of at least one outer and one inner partial piston. The partial pistons are displaceable into one another in a telescope-fashion.

Unless expressly stated to the contrary, in the following only the simplest version of such a system of concentric partial pistons will be described, which consists of only one outer and one inner partial piston, while expansion to a larger number of partial pistons in a completely analogous fashion is possible.

In a first variation on the invention, provision is made such that the outer partial piston is impacted by a restoring element, for example a compression spring. A stop is provided for the inner piston at a pin that extends from a bottom of the cylinder. This embodiment has the advantage that, as will be seen below, a hole in the wall of the outer partial piston can be avoided whereby, however, following the impact of the inner partial piston, the outer piston must continue to move in the annular space formed between this inner piston and the cylinder wall. This may possibly involve clearance problems and in any event imposes high requirements on the manufacture and design of the valve.

In another variation on the invention, provision is made such that the inner partial piston is impacted for example by a compression spring as the restoring element. In this manner, the wall of the outer piston has a radial opening in the area exposed by the inner piston. Further, the cylinder also has two axially spaced openings of which one is flush with the opening in the piston wall in the impact position of the outer piston while the other is exposed by the outer piston during the movement of the outer piston in the direction of the stop.

As already mentioned, such an embodiment can easily be extended to more than two partial pistons. For example, three partial pistons that are displaceable relative to one another in a telescope-fashion and are each connected by a dog can be provided. In this case, the outer piston has two axially spaced openings in its wall while the middle piston has an opening such that, in both stop positions of the outer and middle partial pistons, the opening is flush with one of the openings in the outer pistons and with one of the openings in the cylinder wall. The cylinder wall thus has three openings which are aligned flush with one another by virtue of the movement of all three pistons, in this case by the upper edge of the outer partial piston, and then by the two inner partial pistons, and in this case by the edge of the middle partial piston and by two openings in the outer partial piston and cylinder wall that are flush with one another, and finally by the inner partial piston, namely by its upper edge and once again by two additional openings in the cylinder wall and the outer piston that are flush with one another, which are also flush with an opening in the middle partial piston.

In the above-mentioned embodiments, step-wise tapers of the inside wall of the cylinder can be provided as a stop in the above-mentioned embodiments.

It is also advantageous if, in such partial pistons that slide into one another in a telescope-fashion, devices are provided which prevent a relative rotation of at least the outer partial piston with respect to the cylinder wall in order to ensure that the respective holes can be aligned flush with one another. It is understood that these holes in principle can have any cross-sectional shape. Therefore, in particular, they can be elongate holes that extend in the lengthwise direction of the pistons and cylinder walls or in their circumferential directions.

Alternatively, or in addition, on the inside surface of the cylinder wall (or on the outside wall of the piston in question), in each case at the axial level of the openings, grooves that run around in the form of a ring can be provided. These grooves also produce a connection between these openings with a relative rotation between the openings of the partial piston and the cylinder. This concept of annular grooves, when more than two partial pistons are used, can also be expanded to the guide surfaces of the individual pistons that are in sliding contact with one another.

In addition, variations on the regulating valve according to the invention appear advantageous in which the outer partial piston or pistons are so designed that after a first opening in the cylinder wall is exposed during their movement in the direction of the stop, this opening can be closed again by other wall sections when, or shortly before, they reach the respective stop position. In this case, an opening in the piston wall is flush with another opening in the cylinder wall.

Other objects, advantages and novel features of the present invention will become apparent from the following detailed description of the invention when considered in conjunction with the accompanying drawings.

DETAILED DESCRIPTION OF THE DRAWINGS

It should be basically noted in connection with all the figures that they are only schematic representations and that the specific dimensions and especially the spatial arrangement of the outer connections may differ significantly in practice from the embodiments shown. However to the extent that specific relative dimensions and positions of individual elements play a role, this is expressly described.

Figure 1:
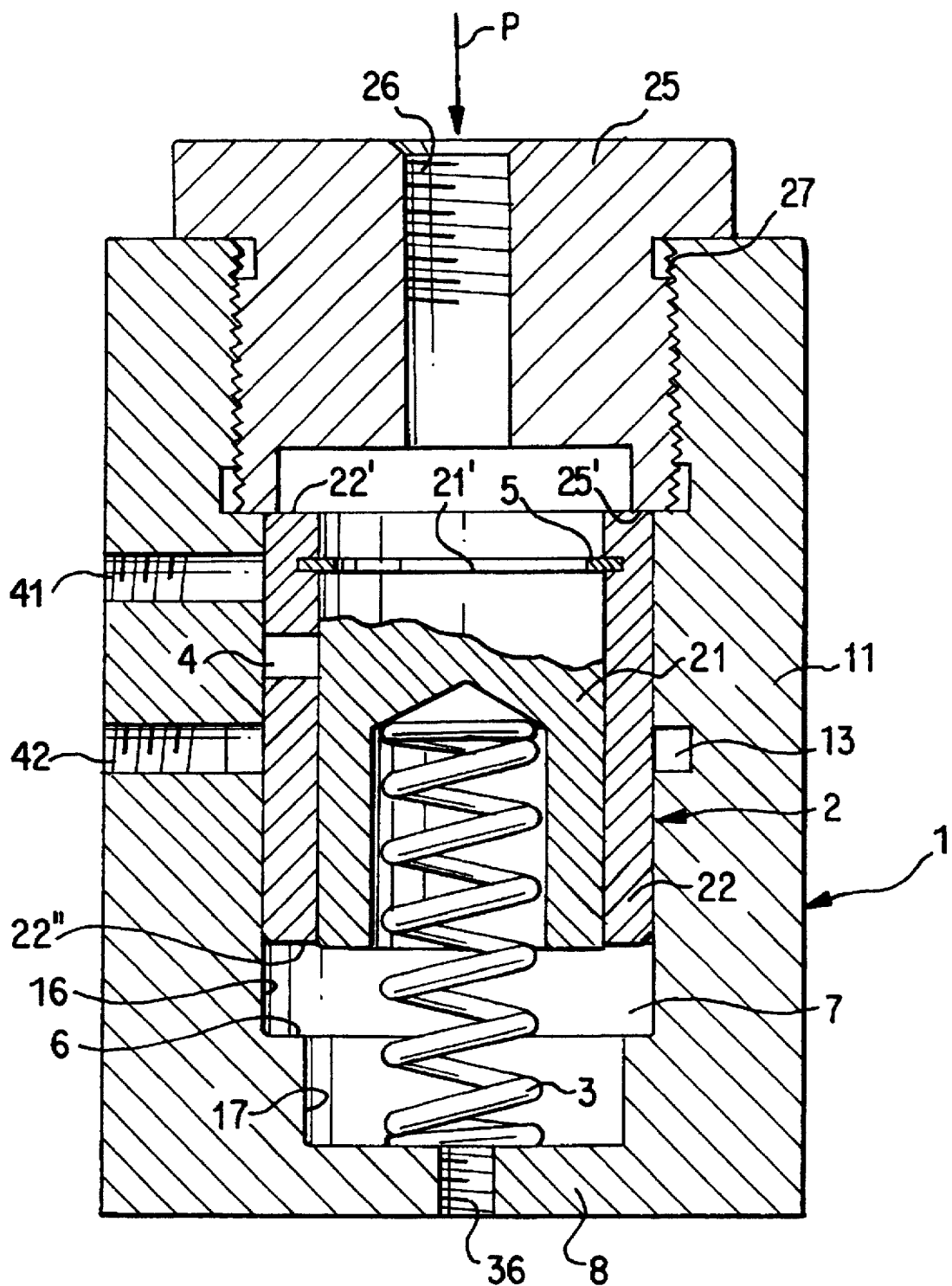
FIG. 1 is a first embodiment of a multistage regulating valve.

FIG. 1 shows a cylinder 1 with a blind hole 7, a wall 11, a bottom 8 at one end and a thread plug 25 at the opposite end. The blind hole 7 in cylinder 1 is staggered with several diameters and in the vicinity of plug 25 has a threaded section with an internal thread 27. The diameter range 16 that leads to regulating piston 2 is tapered slightly with respect to threaded section 27 and at a distance from bottom 8 has a step to a diameter range 17 that is tapered even further, with this step arrangement 17 forming a stop 6 for outer partial piston 22 of regulating piston 2.

It is also possible within the framework of the invention to provide blind hole 7 as a through-bore which is sealed by means of a plug. The tapering diameter range 17 and stop 6 can be formed by separate parts or by a suitable shaping of the plug.

The two-part regulating piston 2 consists essentially of an inner partial piston 21 and an outer partial piston 22 which has a dog 5 in the form of a spring ring fitted into the inner surface of partial piston 22. Outer partial piston 22 is thus a hollow cylindrical part in which inner partial piston 21 is slidably guided. Dog 5 limits the sliding movement of inner partial piston 21 in the direction of threaded plug 25. Plug 25 has a hole forming a pressure connection 26 through which the regulating pressure P is admitted. This regulating pressure P thus acts on the annular upper end 22' of outer partial piston 22 and also on the circular upper end 21' of inner partial piston 21. Inner partial piston 21 is pretensioned directly by means of a compression spring 3 located in the blind hole against the direction of the force directed by regulating pressure P on the ends 21' and 22' of the two partial pistons 21, 22, whereby in mechanical equilibrium this pretensioning force is compensated by the force exerted by the regulating pressure on the other side of partial piston 21 and, by means of dog 5, also on the pressure-side end of outer partial piston 22. Outer partial piston 22 has no restoring spring as such but could, starting from a zero pressure state in which the adjusting travel of the spring does not suffice to move both partial pistons 21, 22 in engagement with one another up to their end stops, be moved under the influence of the regulating pressure P coming from the outside without a counter force only until dog 5 strikes end 21' of inner partial piston 21, so that the restoring force of compression spring 3 acts not only on the inner partial piston 21 but through dog 5 also on the outer partial piston 22. Compression spring 3 is therefore generally dimensioned so that with a very low regulating pressure P or even in the zero pressure state, end 21' of inner partial piston 21 strikes dog 5 and the outer partial piston 22 up to the annular lower edge 23' of plug 25 that acts as a stop.

With increasing regulating pressure P, the force acting on ends 21' and 22' of partial pistons 21 and 22 increases and, at a pressure PO that depends on the specific choice of compression spring 3, will overcome the force exerted in this position by compression spring 3. At this point, both partial pistons 21, 22 begin to move downward together as a unit, since partial piston 22 has no restoring element of its own but is coupled by dog 5 to inner partial piston 21. As regulating pressure P increases, a further movement of partial pistons 21, 22 occurs against the action of compression spring 3, whereby this movement, as shown in all four figures, is directed downward in each case without the installation location of the valves having to be determined in any fashion. Then the upper edge 22' of outer partial piston 22 initially partly and eventually completely exposes the outlet opening 41 in the wall 11 of cylinder 1, so that the pressure connection 26 and outlet opening 41 form a through connection through the pressure medium. The pressure medium can then flow either from pressure connection 26 to the outlet opening 41 or merely produce a static pressure impact on the elements (not shown) that abut outlet opening 41.

Upon a further downward movement, hole 4 of partial piston 22 and the second outlet opening 42 in cylinder wall 11 finally begin to overlap and are finally exactly flush with one another when the lower annular end 22' of partial piston 22 reaches stop 6 formed by the step. The outlet openings 41, 42 and hole 4, upper and lower ends 22', 22" of partial piston 22, and stop 6 can be arranged, for the most part, in any fashion so that, for example, the overlapping of hole 4 and outlet opening 42 simultaneously with the exposure of outlet opening 41 by the upper edge 22' of partial piston 22 takes place, or so that this overlap occurs only with a delay. In addition, hole 4 and outlet opening 42, when partial piston 22 strikes stop 6, need not be flush with one another in the circumferential direction, but need only be essentially at the same axial height or overlap in the axial direction. For this purpose, a circumferential annular groove 13 is provided on the inside wall of blind hole 7 which in any event produces a connection between hole 4 and outlet opening 42 when they are either at the same height in the axial direction or overlapped in the axial direction.

If, however, the outer partial piston 22, for example at a pressure P1, has just reached stop 6, then the hole 4 is uncovered or closed on the inside of partial piston 22 by the inner partial piston 21 since the latter is as before engaged with its end 21' with dog 5 (in FIG. 1, only the lower part of inner partial piston 21 is shown in section, which also extends as far as dog 5).

Now if regulating pressure P increases further, the force acting as a result of this pressure on outer partial piston 22 is taken up by stop 6 and therefore cannot be transmitted through dog 5 to partial piston 21.

The compressive force required to overcome the restoring force of spring 3 in this position must now be provided exclusively by partial piston 21 whose upper end 21' however is clearly smaller than the previously effective end surface 21', 22' of partial pistons 21 and 22 together. This loss of area must therefore be compensated by a pressure increase up to a pressure P2 at which partial piston 21 begins to separate from dog 5 and to move further against the restoring force of compression spring 3. Pressures P1 and P2 are linked to the end surfaces F1 and F2 of the inner and outer partial pistons 21 and 22 by the relationship:

$$\frac{P2}{P1} = \frac{F1+F2}{F1}$$

where:

P1=pressure at which outer partial piston 22 just reaches stop 6

P2=pressure at which inner partial piston 21 begins to move away from dog 5

F1=effective end area 21' of inner partial piston 21 impacted by pressure, and

F2=effective end area 22' of outer partial piston 22 impacted by pressure.

Therefore, with a further increase of the pressure above the value P2, partial piston 21 continues its downward movement and can thus eventually also expose hole 4 from the inside so that the outlet opening 42 also communicates with pressure connection 26 through-hole 4, and possibly also through the circumferential annular groove 13.

In a version not shown, outer partial piston 22 and the corresponding cylindrical pressure measurement diameter range 16 are made somewhat longer upward in the direction of threaded plug 25. Further, instead of the upper edge of partial piston 22 as the element that exposes outlet opening 41, another hole is provided above dog 5 in the extended wall of outer partial piston 22 which during the downward movement of outer partial piston 22 (or of both partial pistons 21, 22 together) produces the connection between pressure connection 25 and outlet opening 41, possibly with interposition of an additional annular groove. With a continued downward movement of outer partial piston 22 however, this connection is again interrupted by the upper edge of the additional hole, so that this additional hole located above dog 5 assumes approximately the same position that was assumed by hole 4 in FIG. 1 when the lower end 22' of partial piston 22 reaches stop 6. In this manner, a switching effect is achieved, in other words starting with interruption of the connections between outlet openings 41, 42 with pressure connection 26 corresponding to the situation shown in FIG. 1, after a pressure rise there is first a connection of the outlet opening 41 with pressure connection 26 and then a connection of outlet opening 42 with pressure connection 26, with the connection to outlet opening 41 being interrupted once more.

Thus, depending on the arrangement and size of the holes 4 in question, the outlet openings 41 and 42, as well as the additional hole (not shown) added above dog 5 in wall 11 of outer partial piston 22, a smooth transition can be achieved if desired in which in an intermediate pressure range a partial connection is produced between outlet opening 42 and pressure connection 26, while the connection between outlet opening 41 and pressure connection 26 still exists. However, the arrangement can also be such that initially the connection between outlet opening 41 and pressure connection 26 is suppressed before a connection is created between outlet opening 42 and pressure connection 26.

It is understood that outlet openings 41, 42 need not terminate on the outside wall of cylinder 1 but that corresponding connections can also be provided endwise, for example on the bottom, whereby additional connecting nipples or threads can be provided for these connections.

The embodiment shown in FIG. 2 follows exactly the same functional principle as the embodiment described in connection with FIG. 1 with the difference being that here regulating piston 2 consists of three displaceable partial pistons 30, 31, and 32 arranged coaxially with respect to one another and telescoping into one another. Here again the inner partial piston 30 is impacted by a compression spring 3 as a restoring element and dogs 5 and 5' are each formed as an inwardly projecting bead or flange on the upper end of the middle partial piston 31 or outer partial piston 32. These dogs are not necessarily located on the upper edge of these partial pistons, but can be provided at any axial height of the partial pistons.

In accordance with the additionally provided partial piston 32, in contrast to the embodiment of FIG. 1, an additional regulating stage is provided. In this case, an additional outlet opening 43 is provided in cylinder wall 11 so that there are a total of three outlet openings 41, 42, 43. The outer additional partial piston 32 therefore necessarily has two holes 4, 4' instead of the one hole 4 of the embodiment in FIG. 1. In addition, partial piston 31 also has a hole 10. The cylindrical blind hole 7 of cylinder 1 is stepped down twice to form two stops 6 and 6' for the outer and middle partial pistons 30, 31, respectively. The three partial pistons, 30, 31, 32 are likewise impacted with pressure through pressure connection 26 and initially moved downward together until the upper edge 32' of partial piston 32 exposes outlet opening 41 and partial piston 32 then strikes stop 6.

Holes 4, 4' of outer partial piston 32 together with outlet openings 42, 43 and annular grooves 13 and 14 simultaneously lie at the same axial height. In this position, the middle partial piston 31 can move further downward together with the inner partial piston 30 during a further pressure increase so that the upper edge 31' of middle partial piston 31 finally exposes opening 4 which, as already mentioned, communicates with outlet opening 42. Thus, when a corresponding pressure value is reached, the connection between outlet opening 42 and pressure connection 26 is produced. Finally, middle partial piston 31 also reaches stop 6' whereupon hole 10 is once more at the same axial height as hole 4'. In this position, holes 10, 4' are flush with outlet opening 43. If the pressure continues to rise, inner partial piston 30 will shift further until its upper edge 30' reaches the connection between pressure connection 36 and hole 10, 4'. By analogy with annular grooves 13 and 14, likewise in the inside wall of outer partial piston 32 or in the outside wall of middle partial piston 31 at the level of hole 4' (or 10), a circumferential annular groove 15 can be provided. Annular grooves are basically intended for the case when the pistons are not secured against rotation. By analogy, with the above description of a version for FIG. 1, not shown, here again partial pistons 31, 32 can be extended upward from dogs 5, 5' and the function of the edges which expose the individual openings can again be assumed by corresponding holes in the walls of the partial piston, so that after the individual outlet openings 41, 42, 43 have been exposed, which happens successively from top to bottom, with the corresponding pressure rise the closure of outlet openings 41, 42, 43 can again be effected when (or before) the connection of the pressure connection 26 to the next outlet opening (42 or 43) is made.

Figure 3:
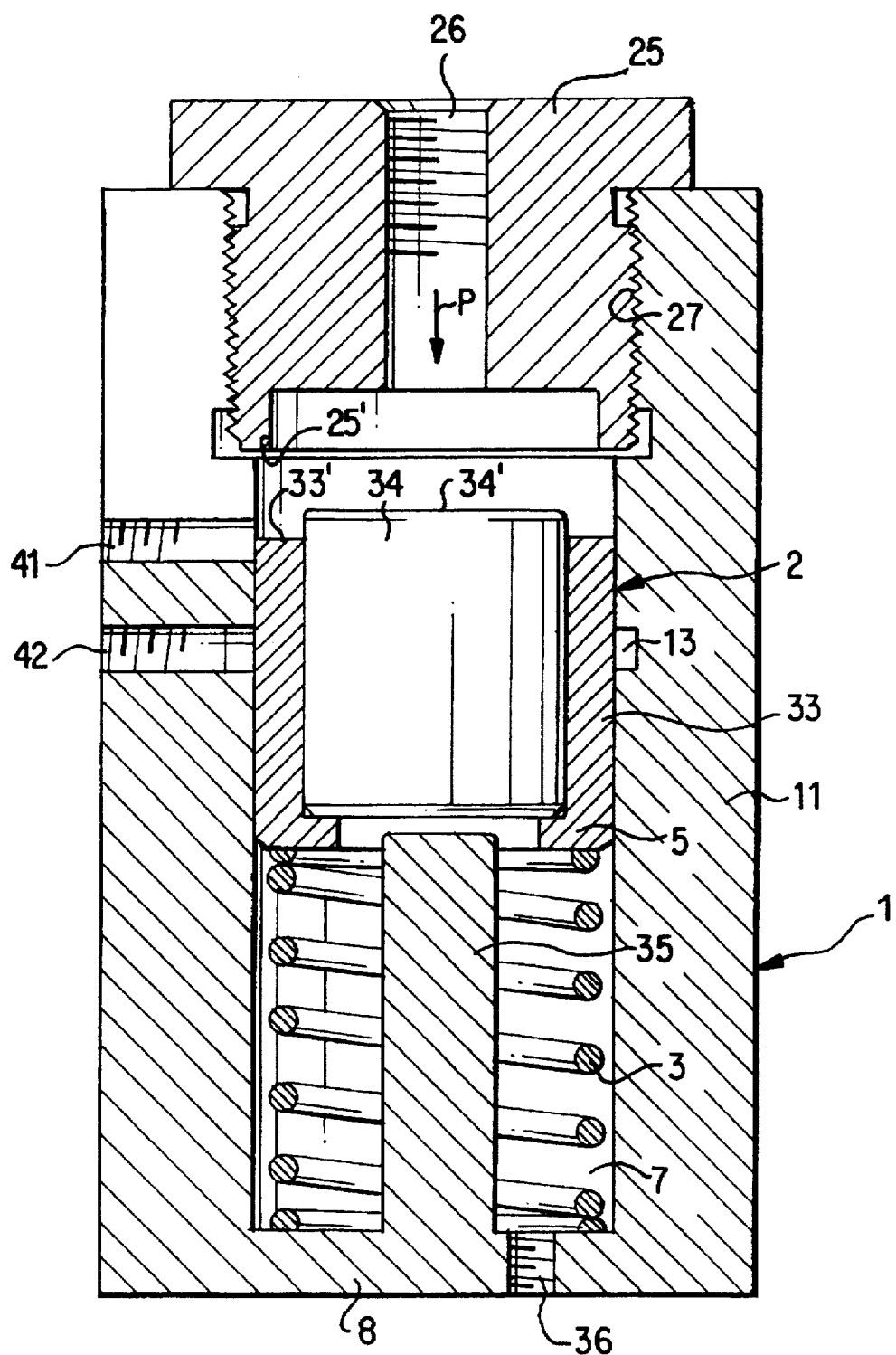
FIG. 3 is a third embodiment of a multistage regulating valve in which, in contrast to the embodiment in FIG. 1, the roles of the inner and outer partial pistons have been reversed.

FIG. 3 shows another embodiment in which a hole in the outer partial piston 33 can be completely eliminated or the number of holes in the outer partial piston 33 can at least be reduced. In this case, the first partial piston impacted by the compression spring 3 that serves as a restoring element is outer partial piston 33. Inner partial piston 34 acts only through a dog 5 formed as a radially inwardly projecting bead on the lower edge of outer partial piston 33, on compression spring 3. The pressure connection 26 in turn is provided on a threaded plug 25 and acts on the end faces 33', 34' of both partial pistons, 33, 34, whereby under the influence of regulating pressure P both partial pistons 33, 34 that are connected together by dogs 5, move downward together and, as shown in FIG. 3, gradually expose outlet opening 41 and thus produce its connection to the connection 26.

Central pin 35 that projects from bottom 8 of cylinder 1 into blind hole 7 and is surrounded by spring 3 delimits the travel of inner partial piston 34. With a sufficient pressure rise, the inner partial piston 34 finally reaches a stop of pin 35 so that its further downward movement is prevented and the force for a further compression of compression spring 3 must be provided solely by the compressive force acting on the annular end face 33' of outer partial piston 33. As a result of a suitable pressure increase, it is only when this effective loss of effective end area of regulating piston 2 is compensated that outer partial piston 33 moves further downward and can finally expose outlet opening 42 for a connection with pressure connection 26. As is known, in this case and in contrast to the embodiment in FIG. 1, no hole corresponding to hole 4 is required in outer partial piston 33. Instead of a further hole possibly having to be provided, in order to effect its closure even after the first outlet opening 41 has been exposed, only a single hole would be required in the case of the embodiment in FIG. 3.

Figure 4:
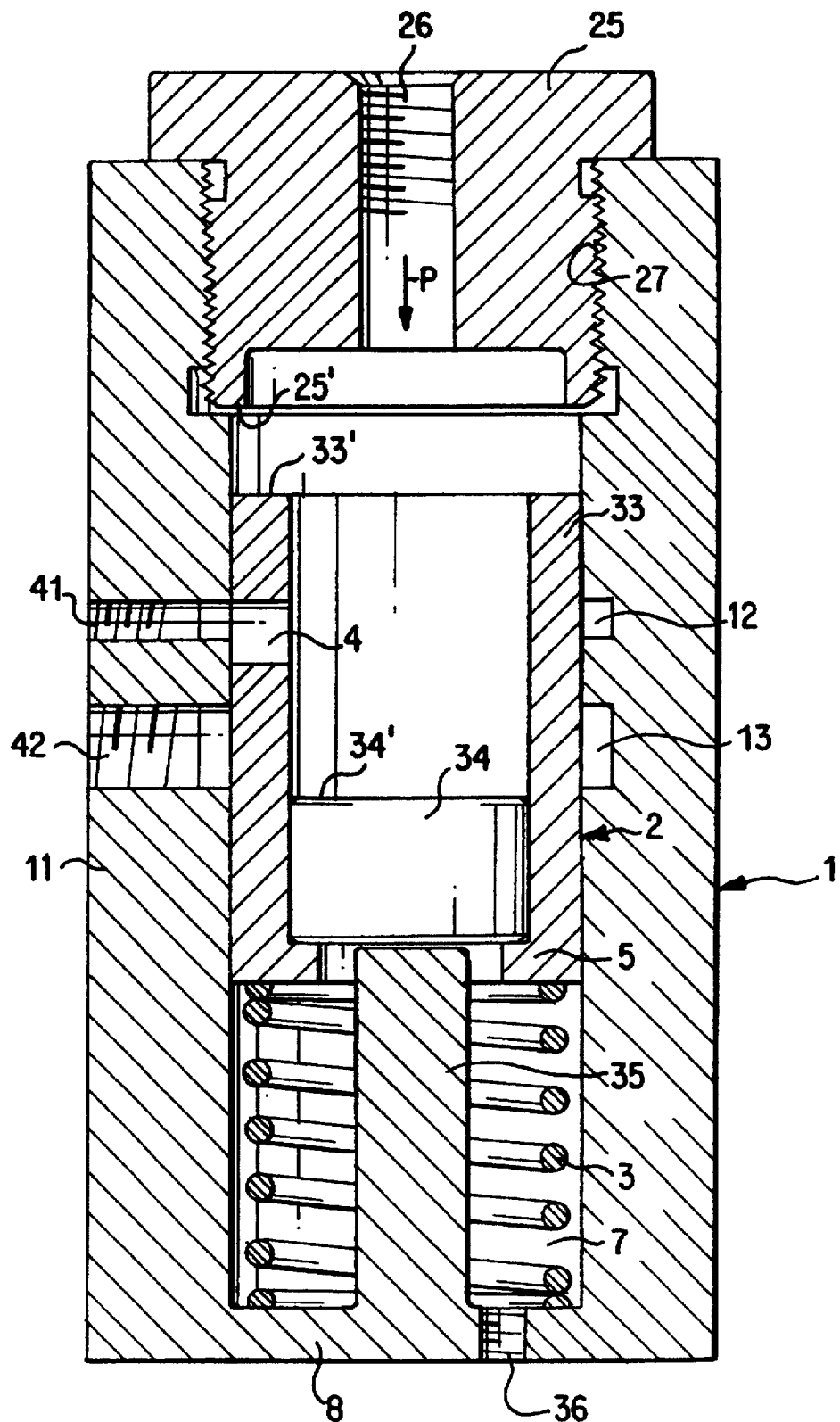
FIG. 4 is an embodiment of a multistage regulating valve similar to the one in FIG. 3 but with a longer and through-bored outer partial piston.

Such a version is shown in FIG. 4. The outer cylinder wall has two outlet openings 41, 42 and the middle partial piston has only one through-hole 4.

As in the embodiment according to FIG. 3, here again with increasing pressure, initially both pistons, namely central piston 34 and outer partial piston 33, are pressed downward together, whereby finally through-hole 4 overlaps outlet opening 41 and a connection is produced between outlet opening 41 and pressure connection 26. Inner partial piston 34 finally comes in contact with central pin 35 and outer partial piston 33 is accordingly moved downward only when the pressure is sufficient on its end 33' alone in order to overcome the opposing force supplied by spring 3. As is evident however, with a further downward movement of middle partial piston 33, outlet opening 41 is closed again and after a further downward movement, simultaneously with or after closure of outlet opening 41, through-hole 4 finally overlaps additional outlet opening 42 and forms the connection between outlet opening 42 and pressure connection 26. Finally, however, the connection between pressure connection 26 and outlet opening 41 can be restored when partial piston 33 has moved downward sufficiently that its upper edge again exposes outlet opening 41.

It is understood that from the position and size of through-hole 4, especially its distance from the upper edge of partial piston 33, and the position and size of outlet openings 41 and 42, as well as the position of the stops, it can be determined whether for example it is always only one of the two outlet openings 41, 42 that can have a connection with the pressure connection or whether at certain pressure states both outlet openings 41, 42 can be connected with pressure connection 26.

Here again of course annular circumferential grooves 12, 13 can be provided on the cylindrical inside wall of cylinder 1 at the axial height of outlet openings 41, 42. The grooves however are only necessary when the connection to the outlet openings 41, 42 is made by holes in the wall of outer partial piston 33 and when it is desired to avoid special measures for aligning partial piston 34 and cylinder 1 in the circumferential direction.

Usually, relief holes 36 are provided in the housing of cylinder 1 on the side of the piston away from the pressure. In addition, an additional pressure to support the spring can be applied through relief bores 36.

Figure 2:
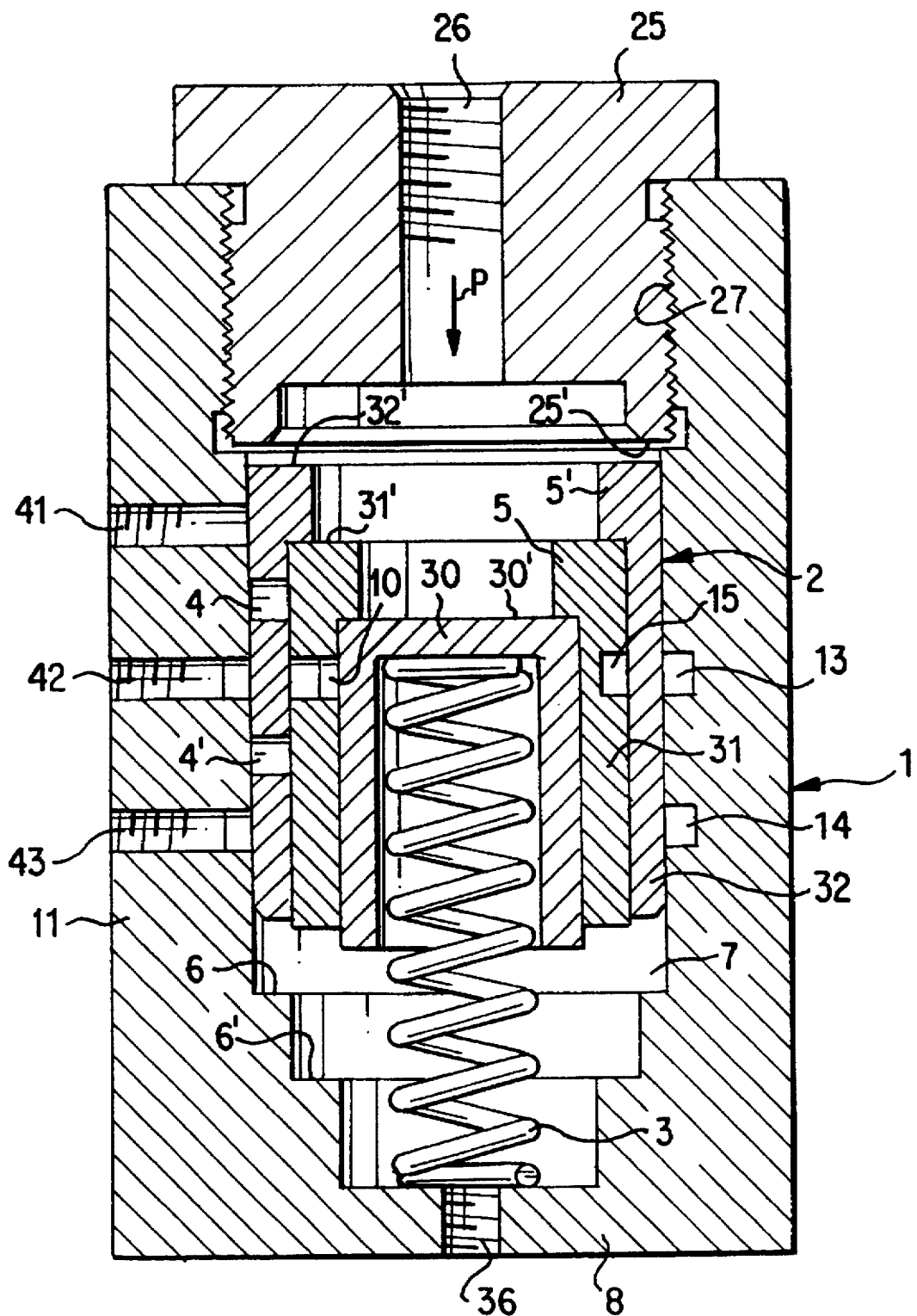
FIG. 2 is a second embodiment of a multistage regulating valve with a three-part regulating piston.

Of course, the embodiments shown in FIGS. 3 and 4 could likewise be implemented using three partial pistons as taught by FIG. 2.

Figure 5:
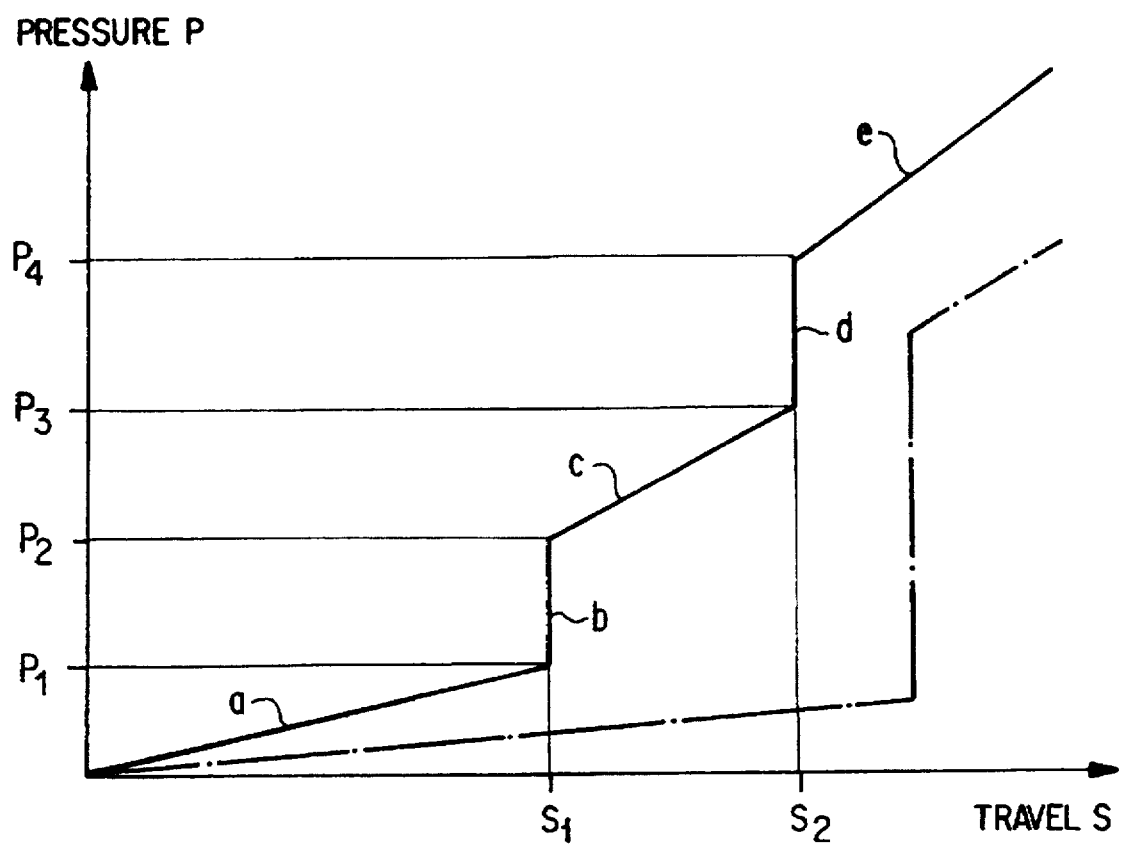
FIG. 5 shows graphical examples of the pressure curve resulting from the use of such valves.

The characteristic curve of a multistage regulating valve, as described above is shown in FIG. 5. In FIG. 5 the system pressure is plotted on the vertical axis against the travel s of the partial piston engaged with spring 3 and movable for the longest distance of one of the valves described above. The pressure prevails in the area of pressure connection 26 and acts on the ends of the partial piston. As already mentioned, all the partial pistons move together at the outset, starting at a very low pressure which in FIG. 5 is assumed to be zero and without spring pretensioning. The adjusting travel corresponding to the spring characteristic is proportional to the force acting on the piston ends which in turn is proportional to the pressure. Thus in the graph of pressure vs. travel, the curve of a straight line segment a beginning at the origin is shown. As soon as the first partial piston reaches its stop after travel $s_1$, the second partial piston initially does not move any further since the force on its end at the pressure $P_1$ then prevailing is initially insufficient to move it further against the force of spring 3. Therefore the pressure can initially rise without any further piston displacement which is illustrated by the first vertical section b on the graph in FIG. 5. It is only when the pressure reaches the value $P_2$ that the force acting on the partial piston(s) which is/are still movable is sufficient to overcome the spring force and the partial piston(s) move(s) further in correspondence to section c on the graph. After travel $s_2$, an additional partial piston at a pressure value $P_3$ may strike a stop, so that the pressure here again rises according to section d of the curve without a further change in travel until, starting at a pressure $P_4$, a third partial piston that may remain moves along section e of the curve with increasing pressure. If the spring had no pretensioning at the beginning, and under the assumption that the spring characteristic is exactly linear, Sections a, c, and e each run through the origin of the system of coordinates in FIG. 5. Then, by means of the position of the stops and by the spring characteristic as well as the relative areas of the partial pistons, all the sections a–d of the curve can be adjusted to any desired length and slope corresponding to the spring characteristic. Therefore, for example, it would be readily possible with a valve having for example two partial pistons, to set a pressure-travel curve that corresponded to the dot-dashed line.

We claim:

1. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

wherein said at least two partial pistons are arranged concentrically with respect to one another so as to provide at least one inner partial piston and one outer partial piston displaceable in a telescoping manner into one another;

wherein said outer partial piston is impacted via a compression spring providing the restoring force, while a pin extending from a bottom of said cylinder is provided as a stop for said inner partial piston configured such that an increased pressure is required to compress the compression spring via only said outer partial piston.

2. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

wherein said at least two partial pistons are arranged concentrically with respect to one another so as to provide at least one inner partial piston and one outer partial piston displaceable in a telescoping manner into one another;

wherein the restoring force is provided via a compression spring acting on the inner partial piston;

wherein said cylinder housing has a blind hole having a lower stop in the form of a step-wise tapering diameter of said blind hole;

wherein the outer partial piston in an area exposed by said inner partial piston has a radial hole in its piston wall;

wherein said cylinder housing has at least two axially spaced outlet openings in its cylinder wall, one of said two axially spaced outlet openings being flush with the radial hole of the outer partial piston in a stop position of said outer partial piston while the other of said two axially spaced outlet openings is exposed by an edge of said outer partial piston in the stop position.

3. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

wherein said at least two partial pistons are arranged concentrically with respect to one another so as to provide at least one inner partial piston and one outer partial piston displaceable in a telescoping manner into one another;

wherein at least three partial pistons are provided so as to slide into one another in a telescoping manner.

4. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

wherein said at least two partial pistons are arranged concentrically with respect to one another so as to provide at least one inner partial piston and one outer partial piston displaceable in a telescoping manner into one another;

wherein said outer partial piston is impacted via a compression spring providing the restoring force, while a pin extending from a bottom of said cylinder is provided as a stop for said inner partial piston;

wherein at least three partial pistons are provided so as to slide into one another in a telescoping manner.

5. The multistage regulating valve according to claim 2, wherein at least three partial pistons are provided so as to slide into one another in a telescoping manner.

6. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

further comprising circumferential annular grooves provided at an axial height of the at least one outlet opening in one of an inside wall of a blind hole in said cylinder housing and an outside wall of an outer partial piston.

7. A multistage regulating valve, comprising:

a cylinder housing;

a regulating piston guided in said cylinder housing having at least one outlet opening in a cylinder wall, said regulating piston being impacted on one side by a regulating pressure and on another side by a restoring force such that, depending on the regulating pressure, said piston exposes the at least one outlet opening either partially, completely, or not at all, said outlet opening interrupting a connection to the one side of the piston impacted by either the regulating pressure or partially or completely creating said connection;

wherein said piston comprises at least two partial pistons each of which is capable of being subjected to the regulating pressure;

wherein a first of said two partial pistons is impacted by the restoring force;

wherein said piston further includes a dog connecting the at least two partial pistons with one another such that a second of said two partial pistons experiences a restoring force through the first partial piston and the dog;

wherein said cylinder housing comprises at least one stop for the second partial piston, said one stop limiting the movement of the second partial piston under the influence of the regulating pressure and against the restoring force, while the first partial piston is not influenced by the one stop and remains movable against the restoring force upon a further increase in the regulating pressure;

wherein said at least two partial pistons are arranged concentrically with respect to one another so as to provide at least one inner partial piston and one outer partial piston displaceable in a telescoping manner into one another;

further comprising circumferential annular grooves provided at an axial height of the at least one outlet opening in one of an inside wall of a blind hole in said cylinder housing and an outside wall of an outer partial piston.

8. The multistage regulating valve according claim 1, further comprising circumferential annular grooves provided at an axial height of the at least one outlet opening in one of an inside wall of a blind hole in said cylinder housing and an outside wall of an outer partial piston.

9. The multistage regulating valve according claim 2, further comprising circumferential annular grooves provided at an axial height of the at least one outlet opening in one of an inside wall of a blind hole in said cylinder housing and an outside wall of an outer partial piston.

10. The multistage regulating valve according claim 3, further comprising circumferential annular grooves provided at an axial height of the at least one outlet opening in one of an inside wall of a blind hole in said cylinder housing and an outside wall of an outer partial piston.

* * * * *